Dec. 6, 1932.  F. C. THOMAS  1,890,198
AIRCRAFT
Filed June 7, 1930  3 Sheets-Sheet 1

Dec. 6, 1932.　　　F. C. THOMAS　　　1,890,198
AIRCRAFT
Filed June 7, 1930　　　3 Sheets-Sheet 2

Inventor
Frederick C. Thomas

By Justin W. Macklin,
Attorney

Dec. 6, 1932.  F. C. THOMAS  1,890,198
AIRCRAFT
Filed June 7, 1930   3 Sheets-Sheet 3

Inventor
Frederick C. Thomas.
By Justin W. Macklin,
Attorney

Patented Dec. 6, 1932

1,890,198

UNITED STATES PATENT OFFICE

FREDERICK C. THOMAS, OF CLEVELAND, OHIO

AIRCRAFT

Application filed June 7, 1930. Serial No. 459,668.

This invention is an improved aircraft and has for its object an aircraft which may be easily controlled and may take off from and land at low speeds on a very limited land space.

Another object of my invention is an aircraft which may be landed safely and in almost vertical direction, and of which the direction of flight may be changed abruptly.

Another object of my invention is an aircraft which will remain in air at very slow flying speeds with very slight loss of altitude.

Still another object of my invention resides in the method of fastening the supporting means on the machine, whereby machines of the usual cabin type may be provided with my supporting apparatus.

Other objects and advantages will become apparent from the following specification in which reference is made to the drawings.

In the drawings—

Figure 1:
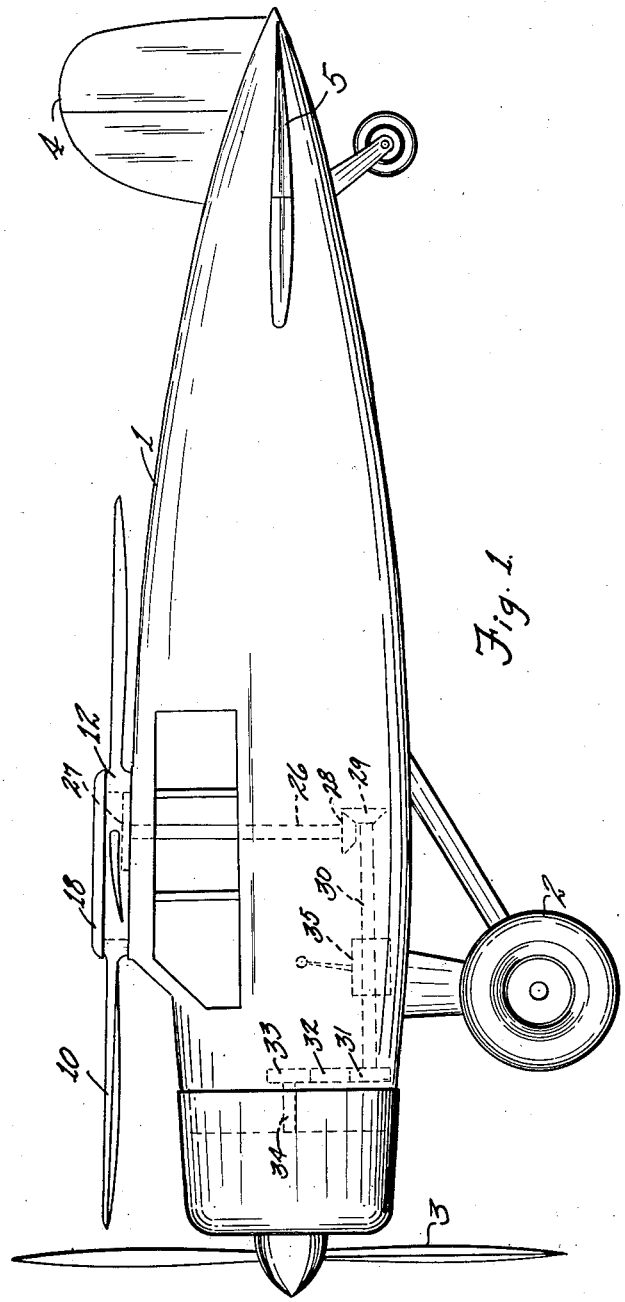
Fig. 1 is an elevation of a flying machine embodying my invention.
Figure 2:
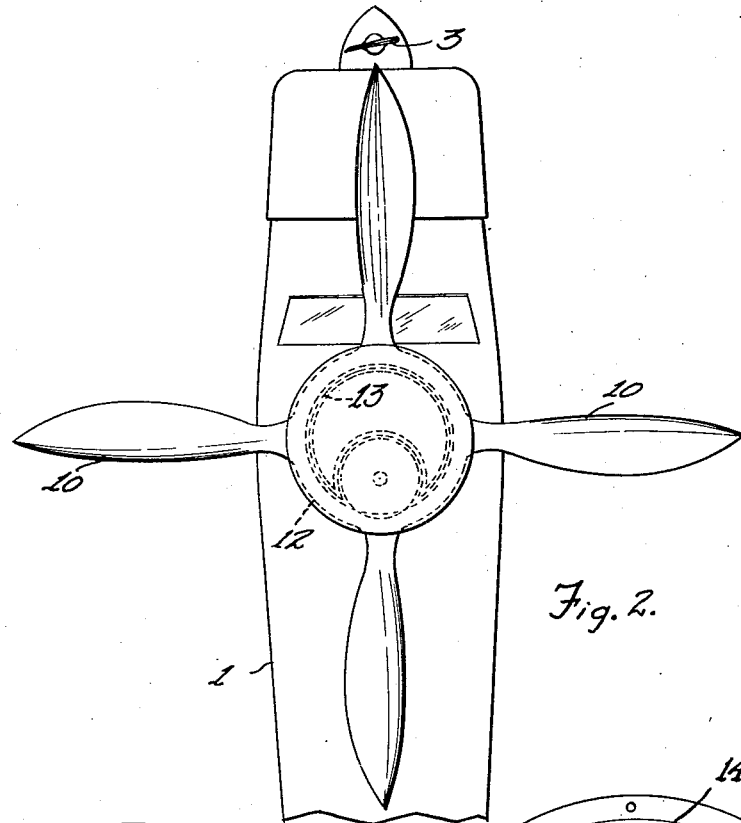
Fig. 2 is a partial plan view of the machine shown in Fig. 1, showing the supporting means.

For the purpose of illustration I have shown my invention embodied in a cabin type of land aircraft, having the conventional body 1 and landing gear 2, and driven from a suitable engine by means of a propeller 3. The controls of the plane may comprise the usual rudder 4 and elevating rudder 5. In order to support the draft in the air I use, instead of the usual wings, a plurality of radial wings 10 mounted on top of the body.

These wings are gyratable about a common axis, which is inclined slightly to the rear of the normal to the axis of the propeller 3, so that the under surface of the wings 10 lie substantially in a plane inclined downward rearwardly of the slip stream of the propeller 3 when in operation. These wings are adapted to gyrate fewer revolutions per minute than the driving propeller 3. The wings 10 may comprise a plurality of radial blades as illustrated, which terminate toward the center in a hub or ring 12. This hub is provided with internal gear teeth 13 for drivingly connecting the wing assemblage to the source of power of the craft in a manner later to be described.

The wings 10 are preferably made of a very light material and may be comparatively flexible as the rotation of the propeller sets up a centrifugal force which acts to stiffen them sufficiently to retain them in a plane, so that they will support the draft in air. Further, the leading edge of each wing lies above the following edge.

It should be noted that, as illustrated, the wings 10 lie close to the body of the craft and are located well within the slip stream of the propeller 3, so as to act on a more compact and solid stream of air on the underside and obtain a suction lift from above.

Figures 3, 4:
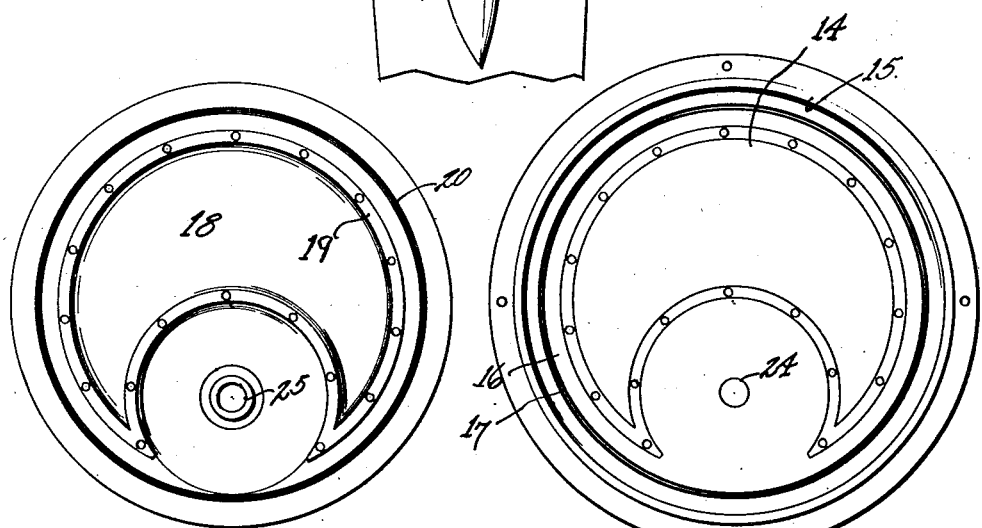
Fig. 3 is an enlarged bottom plan view of the mounting for the machine supporting means.
Fig. 4 is a plan view of another part of the mounting for the machine supporting means.
Figure 6:
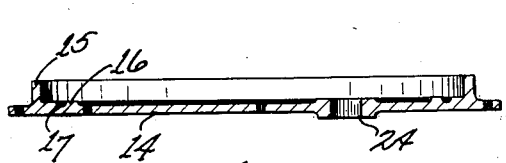
Fig. 6 is a cross sectional view taken on a plane indicated by the line 6—6 in Fig. 4.
Figure 5:
Fig. 5 is a sectional view taken on the plane indicated by the line 5—5 in Fig. 3.
Figure 7:
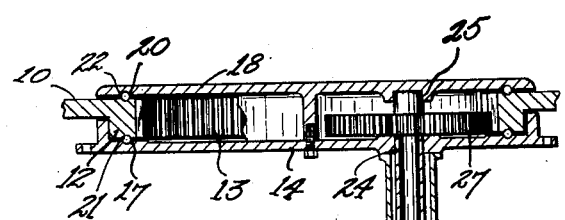
Fig. 7 illustrates a power transmission connection adapted to operate the machine supporting means.

In order to mount the wings gyratably on the body, I provide a plate 14, such as illustrated in Figs. 4 and 6, on the body of the machine. This plate is provided with an annular rib 15, forming a housing for the wing hub 12. On the flat surface of the plate 14 is provided an annular bearing race 16 having annular channel 17 adapted to receive and partially embrace a set of ball bearings. A complementary plate 18, having an annular rib 19, is adapted to lie over the plate 14 so as to form an annular passage between the rib 19 and the rib 15, as better illustrated in Fig. 7. On the plate 18 outside of the annular rib is provided a bearing race 20 similar to the one above described. On the wing hub 12 are upper and lower bearing surfaces 21 and 22 complementary to the bearing surfaces of the plates 14 and 18 respectively. These bearing surfaces are provided with channels of sufficient depth to partially embrace the ball bearings above mentioned. By this arrangement, the ball bearings will act to withstand the thrust of the wings normal to its axis as well as axial thrusts. The plates 14 and 18 are secured together by bolts or other suitable means and thus the bearings withstand the upper thrust of the wing assemblage when the craft is in flight.

The plates 14 and 18 are provided with bearing portions 24 and 25 respectively, in which is rotatably mounted a shaft 26 provided with a spur gear 27 adapted to mesh with the internal gear teeth 13 of the hub 12. The shaft 26 extends outside of the housing thus formed, through the opening in the bearing portion 24 and is actuated from the engine. A suitable manner of driving the shaft for gyrating the wings is illustrated and may include the bevel gear 28 on the shaft 26, meshing with the complementary gear 29 on the shaft 30.

The shaft 30 in turn is driven from the engine by a suitable sprocket 31 and chain 32 which engages the complementary sprocket 33 of the engine driven shaft 34. If desired, a clutch arrangement may be used to drivingly connect the sprocket 33 with the shaft 34 or to render it idle, as desired. To drive the wings at different speeds, a selective gear transmission 35 of any of the usual types may be provided.

In the operation of the craft the propeller 3 is brought up to the usual starting speed and the driving connection through the gears such as described is formed between the engine and the wings. As the machine starts, due to the revolution of the wings 10 and the length of the blades, the wing surface opposed to the air per unit time is equivalent to a large wing spread. The craft rises rapidly, due to the tilt of the wings 10 and the large area opposed to the air. A slight amount of additional lifting may be obtained directly from the gyration of the wings. In turning in air, the craft may be swung easily about the common axis of the wings 10, a very slight forward motion being required to sustain the craft in air. Further, it can turn at very abrupt angles, in as much as the weight of the craft is carried centrally and rotatably about an axis almost normal to the supporting area.

After the craft is in flight, the engine and wings 10 may be drivingly disconnected and the wings will tend to turn, due to the shape of the blades, the air stream from the propeller giving a greater thrust on the thickened side of the blade than on the knife edge.

As described, the gyration of the wings 10 may be very slow compared to the rotation of the propeller 3, yet it will retain the craft in air so long as the forward motion continues.

However, upon landing, especially where it is sought to land at a very abrupt angle, the wings 10 should be drivingly connected with the engine and gyrated at much higher velocity, which, in effect, increases the supporting surface of the flying machine.

By this arrangement, I am able to vary the supporting area. Thus, at slow speeds, I gyrate the wings 10 very rapidly and obtain a very large supporting area. As the speed of the craft increases, the wind resistance becomes very great on a large supporting area. It is desirable to decrease this surface and reduce such resistance at high speeds. Inasmuch as less supporting surface is required at high speed, this reduction of resistance may be effected by decreasing the speed of the wings 10.

In this manner I am able to land the craft by lowering it almost vertically at very slow forward speed. While the wings 10 may be driven other than in the manner shown, I prefer to use the arrangement shown, as it does not obstruct the vision of the pilot or passengers in the cabin and may pass between the seats in a suitable housing, which may form a part of the frame of the plane.

While I have described my invention in connection with a simple arrangement of parts, obviously the wings 10 may be driven through the selective reduction gears, whereby their speed may be varied to meet the requirements of the above. Furthermore, I do not intend to limit my air craft to the use of land craft, but intend to include all kinds of heavier than air craft.

Having thus described my invention, I claim:

In an aircraft of the class described, a plurality of radial wings gyratable about a common axis, and means for gyratably supporting said wings on the body of said craft, said means including an annular hub rigid with said wings, said hub having an upper and lower flat surface and an annular channel on each of its flat surfaces, each adapted to receive and partially embrace a set of ball bearings, a bearing plate on the body of said craft, a complementary bearing plate rigid with said first mentioned plate and in spaced relation thereto, annular bearing channels on each of said plates complementary to those on said hub respectively whereby said plates may rotatably support said hub.

In testimony whereof, I hereunto affix my signature.

FREDERICK C. THOMAS.